US012743698B2

(12) United States Patent
Sheshadri et al.

(10) Patent No.: US 12,743,698 B2
(45) Date of Patent: Sep. 22, 2026

(54) DYNAMIC AUTOSCALING OF SERVER RESOURCES USING INTELLIGENT DEMAND ANALYTIC SYSTEMS WITH DETERMINED BASELINE LEVEL OF SERVER RESOURCES

(71) Applicant: PAYPAL, INC., San Jose, CA (US)

(72) Inventors: Aashish Sheshadri, San Jose, CA (US); Dylan Jacques Grosz, Beaverton, OR (US); Bipra De, San Jose, CA (US); Shyam Pravinkumar Patel, San Jose, CA (US); Greg Anthony Vannoni, Phoenix, AZ (US); Aniruddha Pratap Sathaye, San Jose, CA (US); Satish Krishnamurthy, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 890 days.

(21) Appl. No.: 17/826,071

(22) Filed: May 26, 2022

(65) Prior Publication Data

US 2022/0383324 A1 Dec. 1, 2022

Related U.S. Application Data

(60) Provisional application No. 63/194,155, filed on May 27, 2021.

(51) Int. Cl.
*G06Q 20/40* (2012.01)
*G06F 9/50* (2006.01)
(Continued)

(52) U.S. Cl.
CPC ........... *G06Q 20/4016* (2013.01); *G06F 9/50* (2013.01); *G06F 9/5044* (2013.01); *G06F 9/505* (2013.01);
(Continued)

(58) Field of Classification Search
None
See application file for complete search history.

(56) References Cited

U.S. PATENT DOCUMENTS 8,589,549 B1 * 11/2013 Vermeulen ................ G06F 9/50 709/226
10,409,649 B1 * 9/2019 Young .................. G06F 9/5083
(Continued)

*Primary Examiner* — Zujia Xu
(74) *Attorney, Agent, or Firm* — Haynes and Boone, LLP

(57) ABSTRACT

There are provided systems and methods for dynamic autoscaling of server resources using intelligent demand analytic systems. A service provider, such as an electronic transaction processor for digital transactions, may utilize different computing resource to provide computing resources to users. During use of such computing resources by end users and their computing devices, different demand and needs may be required by such users and devices. The service provider may utilize an intelligent machine learning system to predict computing resource needs and demands at different future time periods based on past usages over similar time periods, computing requests and demands, and network communications. The machine learning engines may identify one or more usages curves, which may be of one or more degrees of curvature, to determine potential future usage. Using these past analytics, the service provider may dynamically scale automatic provision of computing resources.

20 Claims, 5 Drawing Sheets

(51) Int. Cl.

| | |
|---|---|
| ***G06Q 20/38*** | (2012.01) |
| ***H04L 47/70*** | (2022.01) |
| ***H04L 47/83*** | (2022.01) |

(52) U.S. Cl.

CPC ......... *G06F 9/5083* (2013.01); *G06Q 20/389* (2013.01); *G06Q 20/4015* (2020.05); *H04L 47/70* (2013.01); *H04L 47/83* (2022.05)

(56) References Cited

U.S. PATENT DOCUMENTS

| | | | | |
|---|---|---|---|---|
| 10,778,599 | B2 * | 9/2020 | Bryc | H04L 47/83 |
| 11,704,673 | B1 * | 7/2023 | Drapeau | G06N 20/00<br>705/72 |
| 2006/0161884 | A1 * | 7/2006 | Lubrecht | G06F 11/3442<br>717/104 |
| 2013/0254374 | A1 * | 9/2013 | Bogdany | G06Q 50/01<br>709/224 |
| 2014/0344155 | A1 * | 11/2014 | Liu | G06Q 20/322<br>705/44 |
| 2015/0006733 | A1 * | 1/2015 | Khan | H04L 47/829<br>709/226 |
| 2017/0085493 | A1 * | 3/2017 | Senarath | H04L 47/522 |
| 2020/0042420 | A1 * | 2/2020 | Gao | G06F 9/5083 |
| 2021/0273858 | A1 * | 9/2021 | Radovanovic | G06Q 50/06 |
| 2021/0303631 | A1 * | 9/2021 | Grebenisan | G06F 18/214 |

* cited by examiner

DYNAMIC AUTOSCALING OF SERVER RESOURCES USING INTELLIGENT DEMAND ANALYTIC SYSTEMS WITH DETERMINED BASELINE LEVEL OF SERVER RESOURCES

CROSS-REFERENCE TO RELATED APPLICATION

This application claims priority and the benefit of U.S. Provisional Patent Application No. 63/194,155, filed on May 27, 2021, the contents of which are hereby incorporated by reference in their entirety.

FIELD OF THE INVENTION

The present specification generally relates to the allocation of system computing resources, and more particularly to allocating computing resources in server environments supporting compute-intensive tasks that may be variable based on user demand at different times.

BACKGROUND

Computing devices, servers, databases, compute pools, and the like may be required to perform a large number of different computing tasks. For example, service providers may provide different computing services to users, which may be utilized at different times in different amounts and demands. Electronic transaction processors may receive more transaction processing, authentication, and/or risk analysis requests at different levels and demands during certain times of day, week, month, season, or the like. In some cases, such as when compute demand is driven by users, the compute demand may vary up and down due to different user, device, or network needs and requirements. Predicting the amount of computing power (e.g., server capacity, compute pool accessibility and availability, bandwidth and network communication usage, etc.) may be difficult due to different changes in user and device activity. When too little computing power and resources are provided by online service provider platforms and systems, compute tasks will be slow to execute and may not complete in time. This may lead to processing errors, inability for computing systems to process requests, and/or system unavailability and offline. However, where too much computing power is provided that results in computing resources idling or being unused, the service provider's platforms and systems may be consuming unnecessary power, memory, and/or CPU cycles while performing inefficient work. Conventional corrections merely analyze a single metric and do not perform a predictive analysis of future requirements. Thus, determining how much computing power should be made available for future demand by users and devices can be a challenging task, and therefore more efficient and intelligent systems for allocating computing resources may be required.

Figure 1:
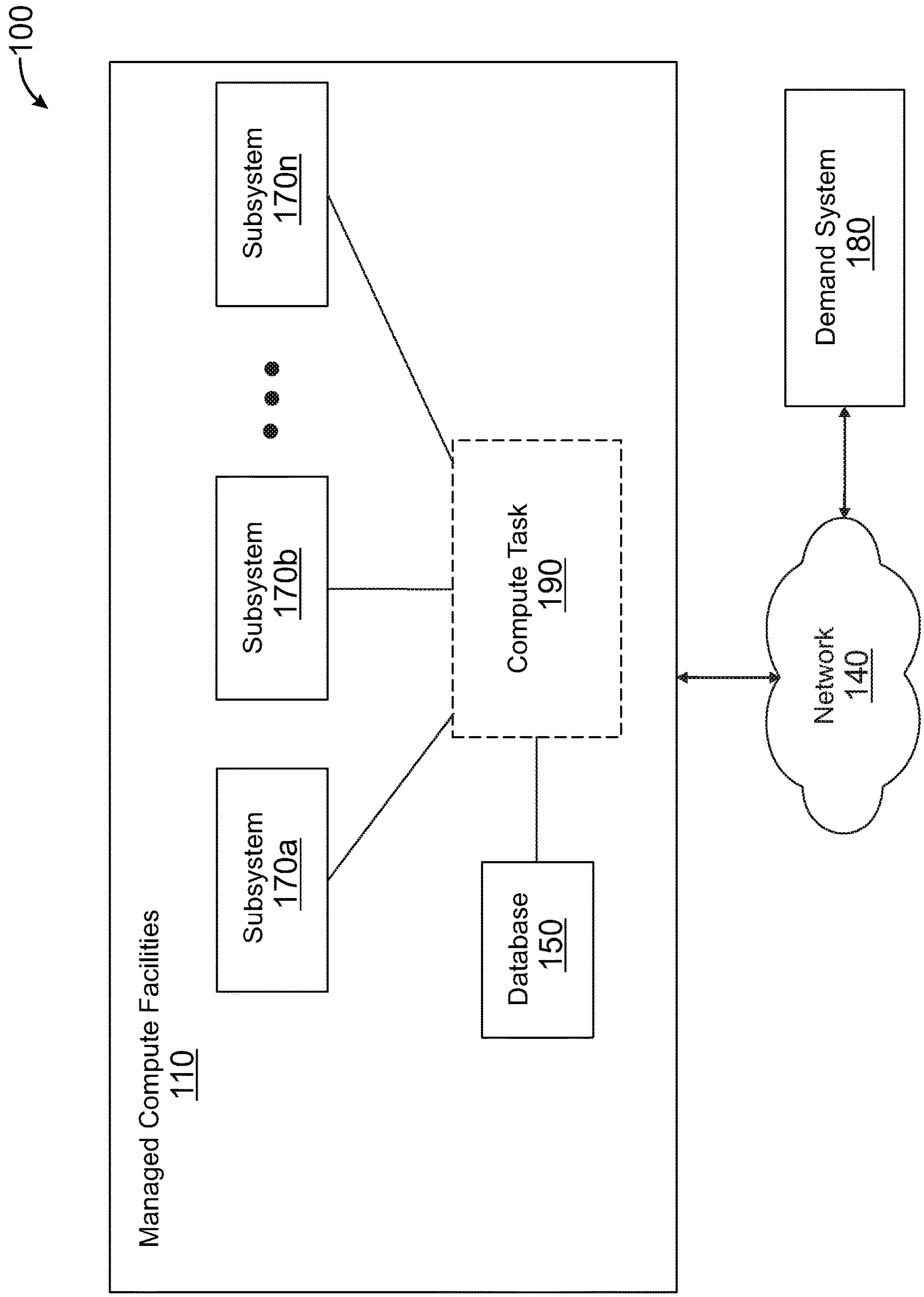
FIG. 1 illustrates a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

Provided are methods utilized for dynamic autoscaling of server resources using intelligent demand analytic systems. Systems suitable for practicing methods of the present disclosure are also provided A service provider, such as an online transaction processor, may provide computing services to end users, devices, and other servers and/or online platforms. For example, the online transaction processor may provide electronic transaction processing, authentication, risk analysis and fraud detection, and the like to various entities (e.g., users, groups of users, businesses, companies, charities, etc.). Provision of these computing resources may utilize and consume computing resources available to and/or provided by those service providers. However, use of computing resources by entities engaged with the service providers may differ at various points in time. For example, during different times of day, week, month, season, or the like, there may be different demand for the computing resources of the service provider during interactive usage.

In this regard, the service provider may utilize an intelligent machine learning (ML) engine that analyzes past computing resource usage during different time periods to predict potential future usage of computing resources. The ML engine may utilize one or more ML models, such as linear and/or linear regression fit curves based on past usage data, as well as gradient boosting machine (GMB) and light GBM tree-based decision-making models, to identify patterns and/or momentums in past user activity, computing resource usage, and/or compute pool requests and processing by the computing resources of the service provider. Based on this analysis, the ML models and engine may predict and determine potential future usage of computing resources and availability of the service provider. The usage may depend on different computing services provided by the service provider, such as communications, authentication, risk/fraud analysis, and the like. As such, the service provider may intelligently allocate computing resources to different computing services based on predicted requirements and past usage analytics and usage curves.

For example, a service provider, such as an online transaction processor may provide services to users, including electronic transaction processing, such as online transaction processors (e.g., PayPal®) that allows merchants, users, and other entities to processes transactions, provide payments, and/or transfer funds between these users. When interacting with the service provider, the user may process a particular transaction and transactional data to provide a payment to another user or a third-party for items or services. Moreover, the user may view digital content, other digital accounts and/or digital wallet information, including a transaction history and other payment information associated with the user's payment instruments and/or digital wallet. The user may also interact with the service provider to establish an account and other information for the user. In further embodiments, other service providers may also provide computing services, including social networking, microblogging, media sharing, messaging, business and consumer platforms, etc. These computing services may be deployed across multiple different applications including different applications for different operating systems and/or device types. Furthermore, these services may utilize the aforementioned ML decision services and systems.

In various embodiments, in order to utilize the computing services of a service provider, an account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The user may also be required to provide financial information, including payment card (e.g., credit/debit card) information, bank account information, gift card information, benefits/incentives, and/or financial investments, which may be used to process transactions after identity confirmation, as well as purchase or subscribe to services of the service provider. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services. Access and use of these accounts may be performed in conjunction with uses of the aforementioned ML services and systems.

Thus, the service provider may provide computing services to various end users, entities, and other devices and systems over a network in order to facilitate such operations. The service providers may provide devices, servers, and databases, as well as pools of such resources, in order to facilitate provision of computing services to users. For example, online digital platforms, cloud computing services, and the like may provide different computing resources and/or compute pools that include central processing units (CPUs), graphics processing units (GPUs), trusted platform modules, databases and data stores, real and/or virtual machines, and the like that may be utilized to provide such computing services to users. The computing resources may be utilized by different services, applications, operations, and the like at different times and in different levels or demand based on the requirements of the end users and/or service provider platform. Thus, such computing resources may have different requirements, availability, and/or usage during different period of time.

During use of these computing resources, the service provider may monitor, track, and aggregate past computing usages over one or more previous time periods. The past computing usage may correspond to statistics on usage of various computing resources provided and utilized by the computing services of the service provider when end users and devices engage with the service provider. For example, the service provider may determine usage of various compute pools during different periods of time and by different computing services. This may include CPU/GPU usage and throughput, processing time and completeness, latency, and other computing resource use and effectiveness. The time periods may be aggregated in batches, such as based on short term (e.g., minutes to hours, such as a two-hour time period), medium term (e.g., a longer time period, which may be minutes, hours, or days, such as a six-hour time period), and/or long term (e.g., a longest period of time for the selected measurement, such as a twelve-hour time period). Once aggregated, this data may be utilized as input training data for an ML engine that includes one or more ML models utilized for predicting and forecasting potential future usage of the computing resources of the service provider's platforms.

Thereafter, the training data may be used to train one or more ML models. This may be effectuated by feeding the training data into one or more ML algorithms and/or operations, which may then fit computing resource usage curves, such as first degree, second degree, and/or linear regression curves, to the training data. The training data may also be used to determine and/or create decision trees, such as gradient boosting machine (GBM) and/or light GBM-based decision trees, which may be used to predict future usage of computing resources. The trained ML models may correspond to one or more predictive operations to determine future computing usage rates and/or requirements at one or more future points in time and/or during one or more future periods of time. These future points and/or periods of time may be based on a time of day, week, month, year, season, or the like. For example, the ML models, once trained, may be used to forecast the predicted demand for computing resources during a specific time of the week (e.g., weekend) or season (e.g., Christmas). The ML models may be continuous learning models where additional live and/or recent training data of computing resource usage (e.g., based on live streaming and/or monitored data) may be used to continuously or periodically adjust the ML models. Such adjustments may change, re-weight, and/or adjust nodes of the ML models. For example, the continuous learning may adjust fitted curves for past computing usage data used to predict future computing resource usage and/or re-weight, change activation functions of, and the like for decision trees of ML models. The ML models may be trained and/or adjusted in order to account for momentum and/or recent change bias for computing resource usage, which may account for increases or decreases in traffic and/or data processing request for the service provider.

The trained ML models may then be used to predict future computing resource usage and/or demand based on past data and prediction inputs (e.g., time of day, week, month, season, etc., with additional factors such as recent network traffic, processing requests, traffic log data, connected devices, authentications and/or logins, etc.). Thus, the past computing resource usage of the service provider's platforms may be analyzed to determine a potential future usage. This may include fitting the past resource usage, consumption, and/or demand to previous curves during the same or similar time periods and/or using decision trees to predict whether computing resources will be required and the level or amount of requirement. The trained ML models may be utilized with specific future time periods based on past time periods, such as by predicting the demand of computing resources during a weekend based on past same or similar weekends. Once predicted, the service provider's ML engine and computing resource allocation system may determine the available computing resources of the service provider during this future time period. For example, the service provider may have more, less, or different compute pools, resources, and the like available at different points in time. This may be based on availability of such resources, baseline and/or required computing resource availability, such as based on service level agreements (SLA), as well as other demands on the service provider's resources.

Using the predicted future computing resource requirements, usage, and/or demands with the future available computing resources, the service provider may intelligently allocate computing resources to one or more end users, devices, and the like. The intelligent allocation may include providing compute pools to requesting devices for data processing needs and operations. Thus, the allocated computing resources may be utilized during data processing operations, while other computing resources may be brought offline and/or allocated to other computing services and requests in order to optimize computing resource usage and efficiency. As previously discussed, the ML model(s) of the ML engine may be a continuous learning model and may therefore be adjusted and reconfigured based on additional training data and past computing resource usage and demand. Further, the availability and allocation of computing resources at current and/or future time periods may also be adjusted. Such adjustments may occur on the fly and further the availability of the computing resources to be adjusted based on large (e.g., over a threshold or percentage) increases or decreases in processing requests, demands, traffic, and the like.

In some embodiments, a threshold or baseline level of computing resource availability may be established to prevent too little (or too much) resources from being allocated and/or made available at certain periods of time based on the ML engine and past computing resource usage and demand. The service provider may implement one or more rules, for example, to provide a baseline of availability and/or buffer of additional computing resources to account for short term demands and/or changes in computing resource usage. Further, the service provider may utilize a mix of on-demand and long-term needs to computing resource usage, such as based on different short, medium, and/or long-term requirements and/or one or more rules for required computing resource availability. This may therefore provide more efficient computing resource availability while minimizing issues with latency and/or processing failures when computing resources are overly utilized or unavailable.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a managed compute facilities 110 in communication over a network 140. A demand system 180 may be utilized by a user to access a computing service or resource provided by managed compute facilities 110, where managed compute facilities 110 may provide various data, operations, and other functions to demand system 180 via network 140. In this regard, demand system 180 may be used to request use of computing services, which may be managed and provided based on predicted future usage requirements and demand by different computing devices and systems. In some embodiments, managed compute facilities 110 may include a database 150 and a compute task 190, where one or more subsystems 170*a*-170*n* are in communication with database 150 and/or compute task 190 (which may be distributed). Network 140 may connect managed compute facilities 110 to one or more demand systems (e.g., demand system 180), which may be an end user system. In some instances, the number of database 150, demand system 180, and one or more subsystems 170 may be different from those shown in FIG. 1.

Demand system 180 and managed compute facilities 110 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Managed compute facilities 110 may be maintained, for example, by an online service provider, which may provide services that use data processing ML models to provide server resources and adjust resource capacity based on predicted resource usage and demand. In this regard, managed compute facilities 110 includes one or more processing applications which may be configured to interact with demand system 180 to receive data for processing and provide computing services. In one example, managed compute facilities 110 may be provided by PAYPAL®, Inc. of San Jose, CA, USA. However, in other embodiments, managed compute facilities 110 may be maintained by or include another type of service provider.

Managed compute facilities 110 of FIG. 1 includes database 150, subsystems 170*a*-170*n*, and compute task 190. Subsystems 170*a*-170*n* may correspond to executable processes, procedures, and/or applications with associated hardware. In other embodiments, managed compute facilities 110 may include additional or different modules having specialized hardware and/or software as required.

Subsystems 170*a*-170*n* may correspond to one or more processes to execute modules and associated specialized hardware of managed compute facilities 110 to provide a platform and framework used by one or more applications, services, and/or platforms of managed compute facilities 110 during use of services and resources provided by managed compute facilities 110. In this regard, subsystems 170*a*-170*n* may correspond to specialized hardware and/or software used by managed compute facilities 110 that further intelligently allocates server resource capacity using ML models and the like. In this regard, subsystems 170*a*-170*n* may include a transaction processing application or other applications and computing services. For example, a transaction processing application may correspond to one or more processes to execute modules and associated specialized hardware of managed compute facilities 110 to process a transaction in subsystems 170*a*-170*n*. In this regard, the transaction processing application may correspond to specialized hardware and/or software used by a user associated with demand system 180 to establish a payment account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by managed compute facilities 110. In some embodiments, the financial information may also be used to establish a payment account.

The payment account may be accessed and/or used through a browser application and/or dedicated payment application executed by demand system 180 and engage in transaction processing through the transaction processing application, such as an application that displays UIs from managed compute facilities 110. The transaction processing application may process the payment and may provide a transaction history to demand system 180 for transaction authorization, approval, or denial. Such account services, account setup, authentication, electronic transaction processing, and other services of the transaction processing application may correspond to compute task 190, such as for risk analysis, fraud detection, authentication, and the like.

Other applications provided by subsystems 170*a*-170*n* may include additional applications to provide features in subsystems 170*a*-170*n*. For example, the other applications may include security applications for implementing server and/or client-side security features, programmatic applications for interfacing with appropriate application programming interfaces (APIs) over network 140, or other types of applications. The other applications may include email, texting, voice and IM applications that allow a user to send and receive emails, calls, texts, and other notifications through network 140. The other applications may also include other location detection applications, which may be used to determine a location for demand system 180. The other applications may include interface applications and other display modules that may receive input from the user and/or output information to the user. For example, the other applications may contain software programs, executable by a processor, including a graphical user interface (GUI) configured to provide an interface to the user.

In order to allocate resources and availability of subsystems 170*a*-170*n*, managed compute facilities 110 may include one or more ML models that may perform predictive determination of future server resource usage and demand. One or more ML models may be trained to take, as input, at least training data and output a recommendation of a prediction, decision-making, or other intelligent recommendation or classification. ML models may include one or more layers, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output scores or classifications. Within the input layer, each node may correspond to a distinct attribute or input data type that is used to train ML models.

Thereafter, the hidden layer may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the ML models that attempt to classify or predict recommendations and other intelligent ML model outputs. These outputs may include allocations of and/or prediction of usage and demand rates for subsystems 170*a*-170*n* at a future period of time, which may be used to provide availability of subsystems 170*a*-170*n* for compute task 190 requested by demand system 180.

Thus, when ML models are used to perform a predictive analysis and output, the input may provide a corresponding output based on the classifications, scores, and predictions trained for ML models. The output may correspond to a recommendation and/or action that managed compute facilities 110 may take with regard to providing computing services and applications in subsystems 170*a*-170*n*. By providing training data to train ML models, the nodes in the hidden layer may be trained (adjusted) such that an optimal output (e.g., a classification or a desired accuracy) is produced in the output layer based on the training data. By continuously providing different sets of training data and penalizing ML models when the output of ML models is incorrect, ML models (and specifically, the representations of the nodes in the hidden layer) may be trained (adjusted) to improve its performance in data classification. Adjusting ML models may include adjusting the weights associated with each node in the hidden layer. Thus, the training data may be used as input/output data sets that enable the ML models to make classifications based on input attributes.

In some embodiments, subsystems 170*a*-170*n* may include memory subsystems, input/output subsystems, network subsystems, kernel subsystems, disk subsystems, process managers, program validation tools, application interfaces, etc. of managed compute facilities 100. For example, subsystems 170*a*-170*n* include network connections/resources, memory/storages, databases, input/output connections, files/folders, authentication/access modules, interfaces, applications, data, servers, and/or the like that may be accessed by the computing device. Database 150 may include data necessary to perform compute task 190, and/or outputs from compute task 190. In some embodiments, compute task 190 may need to interact (e.g., make calls, send requests, etc.) to other parts of managed compute facilities 110 such as but not limited to subsystems 170*a*-170*n*, database 150, etc., when it is executing therein. Compute task 190 may be performed on one or more of subsystems 170*a*-170*n* based on predicted allocated resources.

In this regard, a data load, such as compute task 190, for an ML model and operations received by subsystems 170*a*-170*n* during normal live production computing may be processed by one or more of subsystems 170*a-n* based on allocation of server resources (e.g., subsystems 170*a*-170*n*). For example, the trained ML models may be used to allocate availability of subsystems 170*a*-170*n* at various future times based on predicted server resource usage and demand by various end user devices and systems. In some embodiments, the ML models may utilize fitted curves based on past data, which may be of one or more degrees, as well as decision tree algorithms and the like. The trained ML models may be continuous learning models and may utilize live data to refit the curves and/or adjust weights and nodes of the decision trees. The operations to train and utilize one or more ML models for allocation of subsystems 170*a*-170*n* are discussed in more detail with regard to FIGS. 2-4 below.

Additionally, managed compute facilities 110 includes database 150. Database 150 may store various identifiers associated with demand system 180. Database 150 may also store account data, including payment instruments and authentication credentials, as well as transaction processing histories and data for processed transactions. Database 150 may store financial information and tokenization data. Database 150 may further store data necessary for subsystems 170*a*-170*n* and compute task 190, which may be used for allocating subsystems 170*a*-170*n* and/or processing compute task 190.

In various embodiments, managed compute facilities 110 includes at least one network interface component adapted to communicate demand system 180 over network 140. In various embodiments, the network interface component(s) may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Demand system 180 may be implemented as a communication device that may utilize appropriate hardware and software configured for wired and/or wireless communication with managed compute facilities 110. For example, in one embodiment, demand system 180 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

Demand system 180 of FIG. 1 may contain an application, database, and/or network interface component. The application may correspond to executable processes, procedures, and/or applications with associated hardware. In other embodiments, demand system 180 may include additional or different modules having specialized hardware and/or software as required.

The application may correspond to one or more processes to execute software modules and associated components of demand system 180 to provide features, services, and other operations for utilize systems and services of managed compute facilities 110, where use of ML models with these systems and services may allocate server resource usage and availability based on demand by demand system 180. In this regard, the application may correspond to specialized hardware and/or software utilized by a user of demand system 180 that may be used to access a website or UI provided by managed compute facilities 110. The application may utilize one or more UIs, such as graphical user interfaces presented using an output display device of demand system 180, to enable the user associated with demand system 180 to enter and/or view compute task 190 for one or more processing requests, navigate between different data, UIs, and executable processes, and request processing operations for compute task 190 based on services provided by managed compute facilities 110. In some embodiments, the UIs may allow for requesting processing of compute task 190 using one or more ML models in a live computing environment, which may correspond to a webpage, domain, service, and/or platform provided by managed compute facilities 110.

Different services may be provided by managed compute facilities 110 using the application, including messaging, social networking, media posting or sharing, microblogging, data browsing and searching, online shopping, and other services available through online service providers. The application may also be used to receive a receipt or other information based on transaction processing. In various embodiments, the application may correspond to a general browser application configured to retrieve, present, and communicate information over the Internet (e.g., utilize resources on the World Wide Web) or a private network. For example, the application may provide a web browser, which may send and receive information over network 140, including retrieving website information, presenting the website information to the user, and/or communicating information to the website, including payment information for the transaction. However, in other embodiments, the application may include a dedicated application of managed compute facilities 110 or other entity (e.g., a merchant), which may be configured to assist in processing transactions electronically. Such operations and services may be facilitated and provided using one or more ML models utilized by managed compute facilities 110. In this regard, compute task 190 may be provided to managed compute facilities 110 over network 140 for processing by one or more of subsystems 170*a*-170*n* based on allocation of the server resources using one or more ML models and engines.

Demand system 180 may further include a database stored on a transitory and/or non-transitory memory of demand system 180, which may store various applications and data and be utilized during execution of various modules of demand system 180. The database may include, for example, identifiers such as operating system registry entries, cookies associated with the application and/or other applications, identifiers associated with hardware of demand system 180, or other appropriate identifiers, such as identifiers used for payment/user/device authentication or identification, which may be communicated as identifying the user/demand system 180 to managed compute facilities 110. Moreover, the database may include information for compute task 190 were stored locally, or request data may be input via the application.

Demand system 180 includes at least one network interface component adapted to communicate with managed compute facilities 110 via network 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Figure 2:
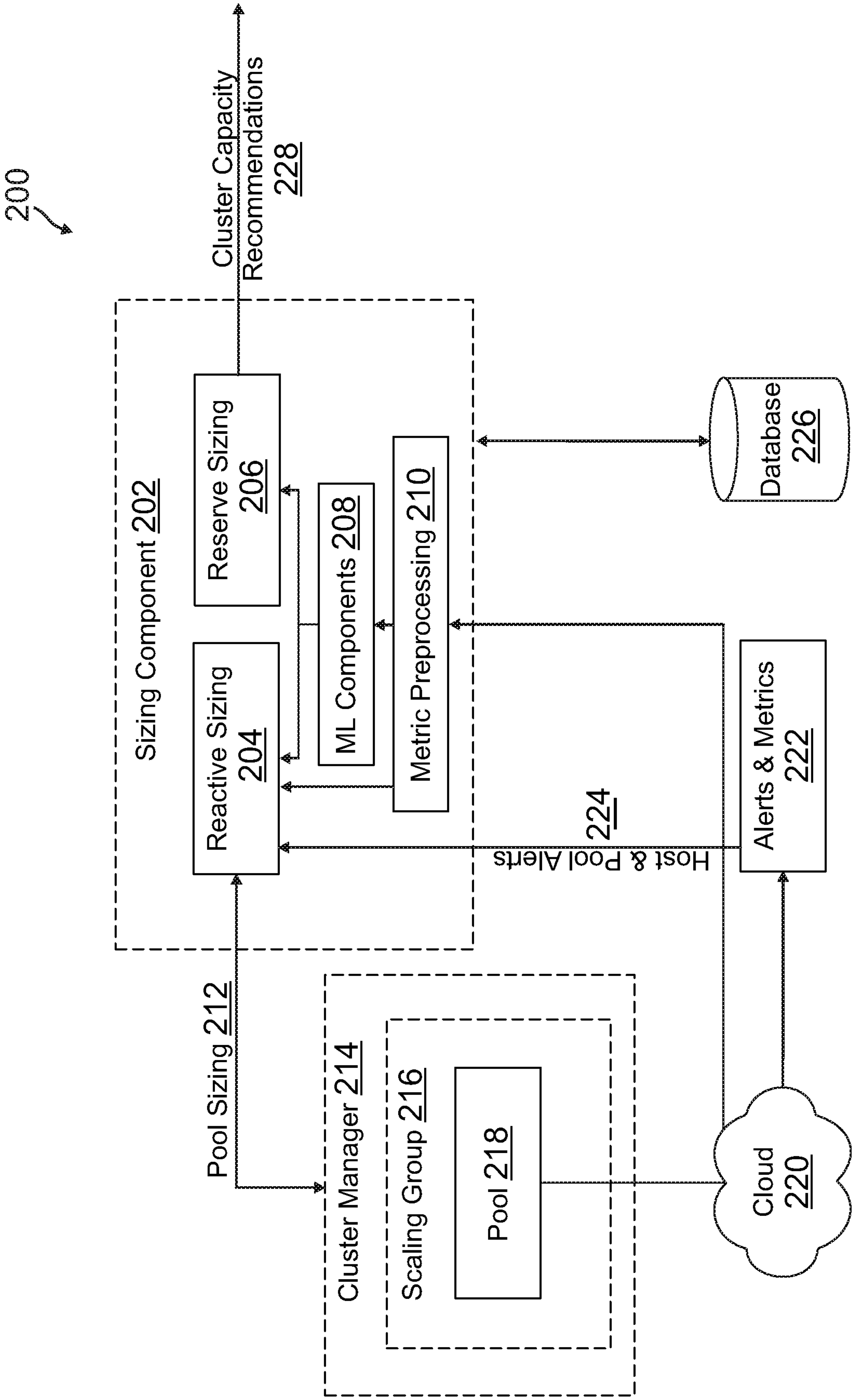
FIG. 2 illustrates an exemplary system environment where computing resource capacity recommendations may be intelligently determined using a machine learning engine for future times, according to an embodiment.

FIG. 2 illustrates an exemplary system environment 200 where computing resource capacity recommendations may be intelligently determined using a machine learning engine for future times, according to an embodiment. System environment 200 of FIG. 2 includes components, operations, and ML engines for ML models that may be utilized by managed compute facilities 110 discussed in reference to system 100 of FIG. 1, for example, to provide automated and intelligent scaling, adjusting, and/or providing of server resources, compute, pools, and other subsystems for computing resources. In this regard, a sizing component 202 may be used to determine whether to increase or decrease availability of server and/or computing resources to demand devices, servers, and systems based on predicted resource usage and/or demand using one or more ML models for a ML engine.

In system environment 200, sizing component 202 may be used to receive data, input, analytics, and/or data loads or data processing requests, which may be utilized in order to provide sizing and allocation operations for server or other computing resources at future periods of time. Sizing component 202 may include one or more components for use in determining reactive and predictive sizing, as well as establishing a set of reserve server and/or computing resources that may be available at a baseline level at all or certain times and/or be provided in response to demand and resource usage from processing requests and data exceeding the allocated resource availability and/or capacity at certain time periods. In this regard, sizing component 202 includes reactive sizing 204 and reserve sizing 206, which may be established using ML components 208 from one or more ML models for a ML engine trained to forecast or predict future resource usage requirements and/or demand by devices, servers, systems, and the like. ML components 208 may be trained and/or provide predictive services based on data from metric preprocessing 210.

In order to initially establish compute pool size and availability at future periods of time, sizing component 202 may interface via an operation for pool sizing 212 with a cluster manager 214 that includes a scaling group 216 for a pool 218 of machines, which may include different available machines and/or pools of machines (e.g., groups of CPUs, GPUs, virtual machines, etc.). Pool sizing 212 may provide data from cluster manager 214 to reactive sizing 204 of sizing component 202, which may include different sizes and/or availability of pools of machines from pool 218. This data may be based on scaling group 216, which scales the sizes and/or compositions of different pools of machines from pool 218. Thus, pool sizing 212 may be used to provide the available server, system, and/or computing resources at one or more future periods of time. Using this data, sizing component 202 may be capable of intelligently allocating these resources, such as pools of machines, at the future time periods based on predicted future resource usage and/or demand. Such predictions for allocation of these resources may be performed by ML components 208. In other embodiments, other server and/or system computing resources may be allocated, reserved, and/or set at future periods of time based on predictions from past resource usage, such as server capacity, compute pool size and/or composition, bandwidth and network communication usage, and the like, which may associated with online digital platforms, cloud computing services, and the like may provide different computing resources and/or compute pools that include central processing units (CPUs), graphics processing units (GPUs), trusted platform modules, databases and data stores, real and/or virtual machines.

In order to process metrics, analytics, and other data for past server and/or computing resource usage by one or more demand devices (e.g., computing devices, servers, systems, and the like), one or more components in system architecture 200 may provide such data to sizing component 202, such as metric preprocessing 210. Cloud 220 may monitor and/or aggregate data for alerts and metrics of past usages of pool 218, which may be provided to the components of sizing component 202. For example, alerts that are tracked and monitored for pool 218 may include alerts associated with usage of one or more compute machines and/or compute pools of machines, which may include CPU alerts, latency alerts, TPM alerts, and/or container count alerts. Such alerts may identify a percentage usage and/or consumption during data processing requests and tasks, which may include usage rates and/or alerts for 99%, 95%, 90%, 75%, and/or other static thresholds. This may also include alerts for sudden changes in such usage of CPUs, latency, TPM, and/or container count.

Alerts and metrics 222 may monitor and collect these alerts, which may then be provided as host and pool alerts 224 to reactive sizing 204. Monitored metrics that are provided to metric preprocessing 210 by cloud 220 may include those metrics that may be useful for predicting and/or determining TPM patterns during past period of time and/or blocks of time (e.g., set hours or hours of the day, time/day of the week, season, etc.). Thus, the metrics may reflect demand on the processing system, components, and resources of the corresponding service provider that is managed by sizing component 202. For example, the metrics may include a max TPM, a median TPM, and a raw max TPM, which may be associated with an inbound count of requests by one or more applications of the corresponding service provider's computing platform and system. Thus, the metrics may be tracked and/or aggregated for different time periods and/or lengths of time, such as a prior two hour (short term), six hour (medium term), and/or twelve hour (long term) period, and/or over the same or similar short, medium, and long term time periods from a previous period of time (e.g., a day, week, or month ago, as well as previous seasons, holidays, months, years, etc.). Thus, the metrics may be used for near- and long-term predictive assessment of future resource usage.

Metric preprocessing 210 may preprocess such metrics for smoothing to dynamically size compute pool deployment and perform pool TPM preprocessing before providing the processed metrics to ML components 208. ML components 208 may include one or more ML models trained using the metrics and/or past resource usages during particular periods and/or windows of time. These ML models may therefore predict future resource usage (e.g., a CPU usage rate or percentage, as well as similar usages and/or required allocation for latency, TPM, container count, and other requirements of compute pools and other machines). Such recommendations may be for rising and falling flux in future predicted resource usage, which may include a predicted max TPM, a buffer of extra resources, a threshold or baseline amount of resources that may always be allocated, and/or an architectural buffer based on rising, flux or peak, and falling predicted usages. In some embodiments, when new recommendations and/or predictions of future computing resource usage are determined, the TPM or other estimates may include safe estimates to prevent drastic or severe adjustments. The types of ML models, curves, decision trees, and operations for dynamic prediction of future server and/or computing resource usage is discussed in further detail with regard to FIG. 3.

Reactive sizing 204 may receive a prediction of future resource usage from ML components 208, and may utilize the prediction to allocate server and computing resources at one or more future times based on the available resources of the service provider's platform and/or system at the future time(s). Reactive sizing 204, based on predictive outputs by ML components 208, may perform reactive sizing and allocation of server and computing resources, such as machines and pools of machines for pool 218, based on a future window (e.g., periodically and/or continuously in 30-minute forward windows). Further, the reactive sizing may include scaling zones, such as climbing, peak, and descending zones for resource usage and demand, and consider scale down lag for sizing and allocation of resources based on usage and demand. Reactive sizing 204 may perform monitoring after allocation. Monitoring by reactive sizing 204 may include alert dynamic sizing for hierarchical alerts on CPU and latency, such as monitoring CPU usage when between 70-110% capacity. Reserve sizing 206 may also establish a reserve of additional server and/or computing resources that may be provided to demand systems in response to data processing requests and the like. The reserved or extra capacity may be associated with unused capacity and may be reserved for required overages from demand and resource usage, or provided for other computational tasks and requirements of the service provider's computing platform and/or system. For example, reserve sizing 206 may provide a strategy to size one or more compute pools up to a peak and size down to a valley, such as by combining information from alerts, recommendations, and raw TPM at certain time intervals (e.g., 15 minutes). In some embodiments, a baseline threshold or amount of resources may always be allocated to prevent reactive sizing 204 from allocating too little or no resources based on a ML prediction of future resource usage.

Figure 3:
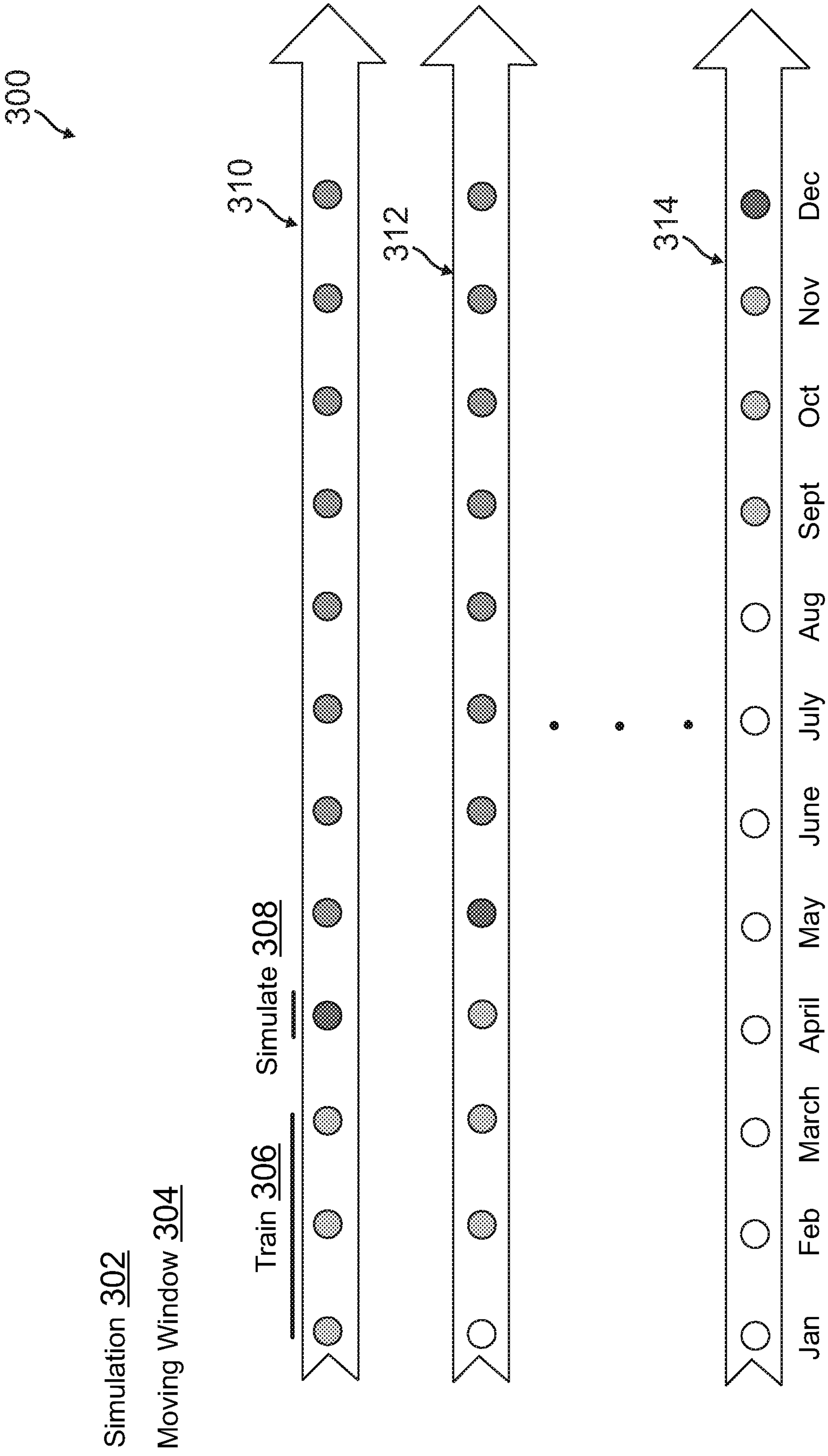
FIG. 3 illustrates an exemplary diagram of training and simulating for predicting and adjusting computing resource usage at future times, according to an embodiment.

FIG. 3 illustrates an exemplary diagram 300 of training and simulating for predicting and adjusting computing resource usage at future times, according to an embodiment. Diagram 300 includes different training and simulating for ML models in production computing environments for server resource allocation and tuning (e.g., increasing, decreasing, and/or establishing baseline resource availability), such as when demand systems use server and computing resources of managed compute facilities in system 100 of FIG. 1. In this regard, training and simulating of ML models shown in FIG. 3 uses the components, operations, and ML engines from system environment 200 of FIG. 2.

In diagram 300, simulation of future predicted resource usage is shown on a moving timeline using one or more ML models, which may be continuously trained and/or adjusted in order to account for different changes in past resource usage by demand devices over previous time periods. For example, in a moving window 304 for simulation 302, which may occur through different time periods (e.g., hourly, daily, weekly, monthly, etc., for example, the months shown in monthly window 314), metrics and other analytics may be analyzed over one or more previous periods of time. In this regard, a past three periods of time may be used for train period 306 in moving window 304 to predict future resource usage during simulate period 308 in windows 310, 312, and 314 of moving window 304. The training data may include the aforementioned metrics from CPU, latency, TPM, container count, and other metrics associated with server and/or computing resource usage during past periods of time for train period 306.

In various embodiments, metric ingestion may be used to determine a max TPM and a median TPM for one or more prior periods of time based on the input metrics that are preprocessed and used to determine one or more machine learning models. During ML model training, one or more first or more degree fitted curves may be determined based on the input metrics. For example, a linear fit slope or curve, or a quadratic fit curve for certain short, medium, and long term prior periods of time may be determined, such as over a two hour, six hour, and twelve hour time period. Rules on threshold may also be determined and configured, including those thresholds for baseline required resource availability and capacity, thresholds for rising, flux or peak, and falling, and the like. In various embodiments, one or more decision trees or other ML models may be trained using a tree algorithm, such as GBM or Light GBM, and decision trees may be used to set or predict future resource usage and required allocation, rise, flux, or fall. A strategy may be implemented based on a max TPM+a TPM adjustment÷an adjusted safe TPM. ML enhancements to predicting future resource usage may be provided through TPM forecasting, future TPM labels, and automatic adjustment of predicted future resource usage.

Pool sizing may be based on a "canary-based sizing." For example, exemplary equations for predicted and/or allocated TPM for future resource usage may include the following computations. Max Pool Size=(Max Expected TPM)+(Canary TPM). For oracle sizing, Pool Size=(Current TPM)+(Canary TPM). For a reactive sizing with a 30-minute lag, such as for an optional percentage of adjusted TPM, Pool Size=(Last TPM)+(Canary TPM). For a predictive reserve sizing (e.g., over 1 hour, 2 hour, or 3 hour increments, Pool Size=(Predicted TPM)+(Canary TPM). Prediction of TPM may also use time series prediction, including statistical operations including ARIMA variance or variations, exponential smoothing variations, and/or FBProphet. In some embodiments, one or more deep learning models and/or methods may be used for predicting TPM, including DeepAR, NBeats, Seq2Seq, and/or Transformer/Multi-Head Attention. In this regard, NBeats may provide deep learning-based forecasting, which may utilize a neural network architecture and/or model that may provide fast and intuitive results. Further, ensemble-based approaches may be used that may train models over multiple different methods and algorithms, where a median point across forecasts and confidence intervals from the forecasts may be used.

Figure 4:
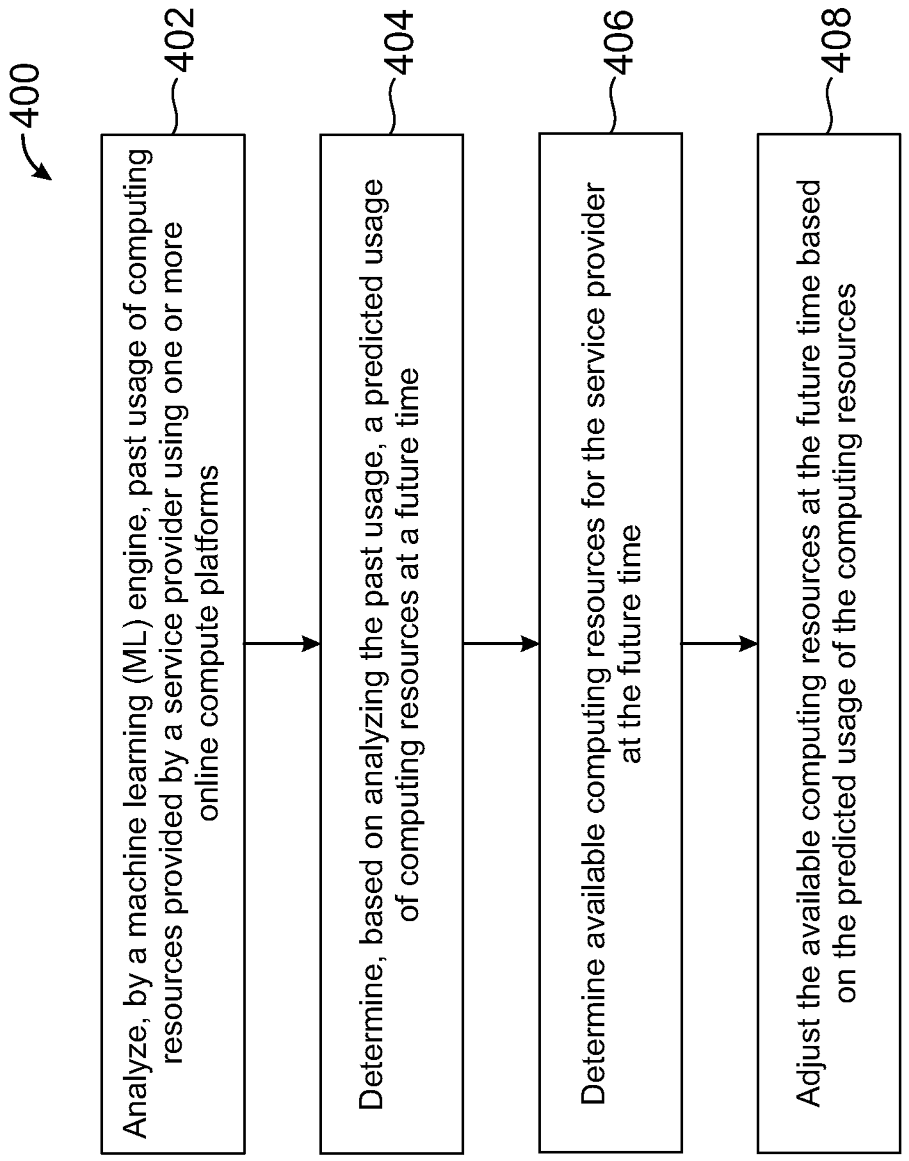
FIG. 4 illustrates a flowchart for an exemplary process for dynamic autoscaling of server resources using intelligent demand analytic systems, according to an embodiment.

FIG. 4 illustrates a flowchart 400 for an exemplary process for dynamic autoscaling of server resources using intelligent demand analytic systems, according to an embodiment. Note that one or more steps, processes, and methods described herein of flowchart 400 may be omitted, performed in a different sequence, or combined as desired or appropriate.

At step 402 of flowchart 400, past usage of computing resources provided by a service provider using one or more online compute platforms is analyzed by a ML engine. The past usage may correspond to one or more data processing requests for a compute task that is to be processed using one or more computing, server, and other resources available to a service provider's computing platforms and systems. For example, usage of computing resources may include usage and/or consumption of those available for CPUs, latency, TPM, container count, and the like, such as those associated with memory subsystems, input/output subsystems, network subsystems, kernel subsystems, disk subsystems, process managers, program validation tools, application interfaces, etc.

Analyzing of the past usage of the computing resources may be done by a ML engine that includes one or more ML models trained to detect patterns and/or predict future usage of the same or similar resources. For example, the ML model(s) may include fitted curves, decision trees, and the like that may predict, based on training data for past resource usage, a potential future usage of computing resources in a short, medium, and/or long term, as well as at specific times of day, week, month, season, or the like. The training of the ML models may be continuous training and/or updating of the ML models, such as based on recent past usage of computing resources by demand devices. Thus, the trained curves and/or decision trees may be changed, reweighted, or the like based on changes to recent training data that may result from different usage of the resources provided by the service provider. In this regard, the training data may correspond to a longer time period, such as the last three months, where models may be fitted and trained for trends in such data.

At step 404, a predicted usage of computing resources is determined based on analyzing the past usage. The predicted usage may be determined by the ML engine utilizing the past usage with the trained models. The potential future usage may be associated with training data for recent past usage over a similar time period or may be associated with time- or temporal-based forecasting for similar past periods of time (e.g., a similar past day of the week, season, etc.). Thus, the ML model(s) may be used to analyze and provide a predictive forecast of future resource usage at one or more future periods of time. The analyzed data by the ML models may correspond to a recent past period of time, and may be of multiple intervals such as short, medium, and long term, which may be used to predict future usage based on the training of the models using training data over a longer period of time (e.g., last X months).

At step 406, available computing resources for the service provider are determined at the future time. The available computing resources may correspond to those computing resources that the service provider may have and/or is predicted to have available at the future period of time. The available computing resources may include those predicted to be online, offline, added, removed, and/or adjusted, such as when different subsystems, cloud computes, machines and/or machine compute pools, and the like are changed with the service provider. At step 408, the available computing resources are adjusted at the future time based on the predicted usage of the computing resources. Adjusting the available computing resources may include increasing or making more computing resources available, decreasing the available computing resources at that time period or from a current level, and/or enforcing a baseline of available computing resources for demand systems.

Thus, a computer system analyzes, using a machine learning engine, past computing usage corresponding to one or more particular computing tasks for a previous period of time, determines based on the analyzing, a predicted future computing usage for a specified future period of time, and computing capacity to be set on one or more particular computing devices for the one or more particular computing tasks based on the predicted future computing usage. This allows for intelligent and predictive allocation of server and system computing resources to more efficiently serve devices, servers, and other systems while maintaining resource availability and reducing processing power costs and usages, server and network loads, and the like.

Figure 5:
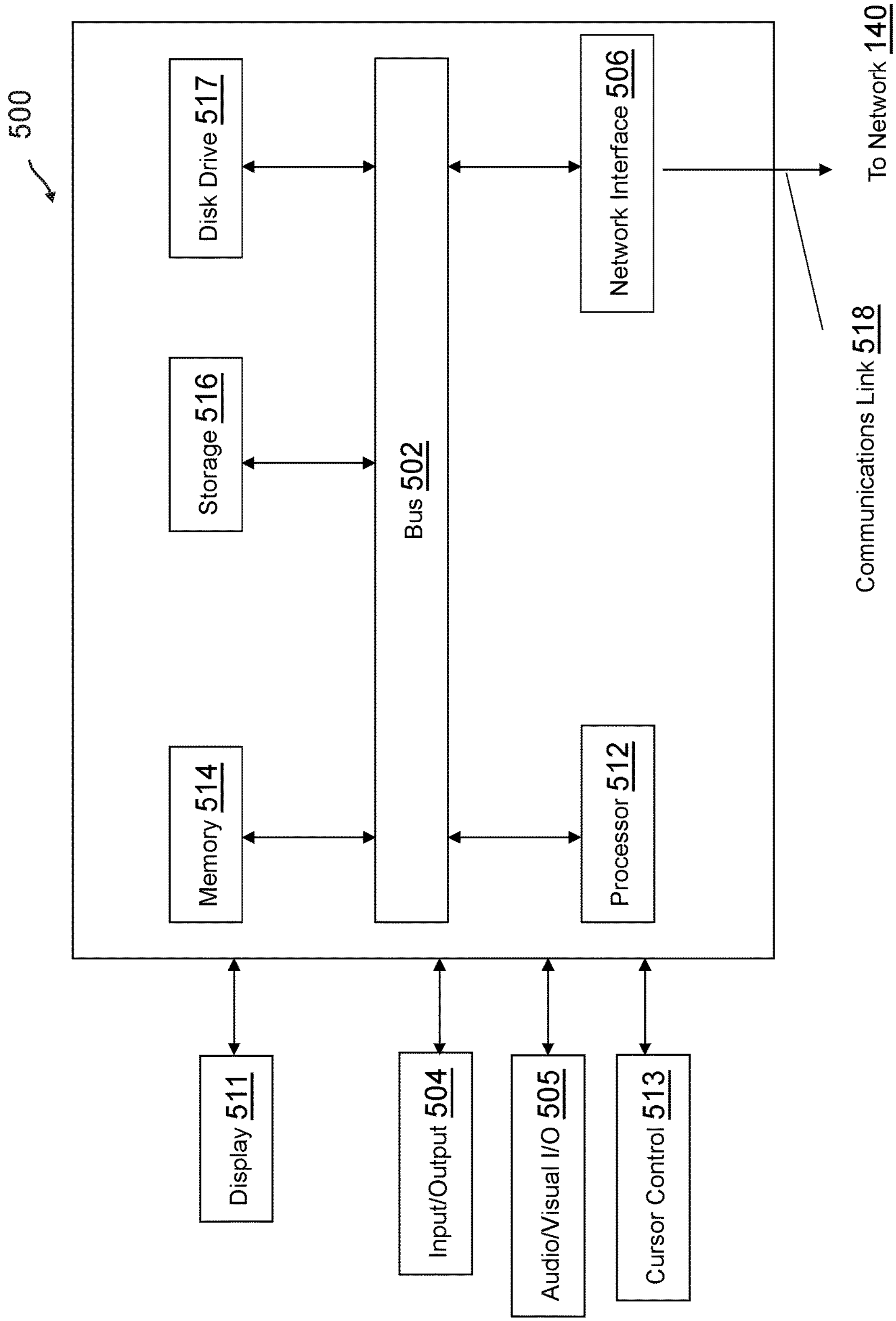
FIG. 5 illustrates a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PT SN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A server system comprising:

a non-transitory memory; and one or more hardware processors coupled to the non-transitory memory and configured to read instructions from the non-transitory memory to cause the server system to perform operations comprising:

analyzing, using a machine learning (ML) engine comprising one or more ML models, past computing usage of server resources of the server system during one or more computing tasks over a previous period of time, wherein the one or more ML models are trained based on demand metrics for a plurality of machine pools capable of processing the one or more computing tasks using the server resources of the server system;

determining, based on the analyzing, a predicted future computing usage of the server resources at a first time during a future period of time;

determining available server resources from the server resources during the future period of time, wherein the available server resources include at least a portion of the plurality of machine pools each having one or more machines operable to perform the one or more computing tasks;

determining, using the ML engine, a baseline level of the available server resources to allocate for the predicted future computing usage based on the past computing usage and one or more rule, wherein the baseline level comprises a threshold amount of resources that is allocated to prevent the available server resources from falling below a minimum capacity of the available server resources;

determining an allocation of at least one machine from the plurality of machine pools that is designated for a dedicated handling of a computing task associated with the predicted future computing usage;

configuring a computing capacity of the available server resources allocated to one or more computing devices at a current time based on the determined allocation of the at least one machine to the dedicated handling of the computing task and the baseline level;

executing the computing task using the at least one machine from at least one of the plurality of machine pools, wherein the executing the computing task comprises:

dynamically sizing the plurality of machine pools to allocate the at least one machine to the computing task, and allocating a reserve machine pool from the plurality of machine pools for additional computing tasks;

analyzing a current computing usage of the server resources based on executing the computing tasks and a plurality of additional computing tasks executed using the available server resource at the current time; and retraining the ML engine based on the current computing usage, wherein the one or more ML models of the ML engine comprise at least one continuous learning model, and wherein the retraining comprises:

utilizing live data from the current computing usage to adjust the at least one continuous learning model based on changes in the past computing usage and the current computing usage over a selected period of time including the previous period of time and the current time, adjusting at least one of a weight or a node of the one or more ML models based on a recent change bias associated with the past computing usage and the current computing usage, and updating the baseline level based on the retraining for future resource allocation at one or more future periods of time.

2. The server system of claim 1, wherein the configuring the computing capacity comprises increasing an amount of the available server resources available to the one or more computing devices at the future period of time from a previously used amount of the server resources utilized during the previous period of time.

3. The server system of claim 1, wherein the configuring the computing capacity comprises decreasing an amount of available server resources available to the one or more computing devices at the future period of time from a previously used amount of the server resources utilized during the previous period of time.

4. The server system of claim 3, wherein the configuring the computing capacity further comprises preventing the amount of the server resources from falling below the minimum capacity of the available server resources established by the baseline level.

5. The server system of claim 1, wherein, prior to the analyzing, the operations further comprise:
applying a short-term bias to the past computing usage based on changes to the past computing usage over a portion of the previous period of time, wherein the short-term bias comprises a fitted curve for the past computing usage over the portion of the previous period of time,
wherein the analyzing further uses the applied short-term bias.

6. The server system of claim 1, wherein the analyzing the past computing usage comprises fitting the past computing usage to a short term curve model for a first portion of the previous period of time, a medium term curve model for a second portion of the previous period of time that is longer than the first portion, and a long term curve model for a third portion of the previous period of time longer than the first portion and the second portion.

7. The server system of claim 1, wherein the computing capacity of the available server resources comprises a capacity for performing a processing of electronic transactions using the available server resources.

8. The server system of claim 7, wherein processing the electronic transactions comprises assessing a risk of fraud for the electronic transactions and assessing an availability of funds to pay for the electronic transactions.

9. The server system of claim 1, wherein the configuring the computing capacity comprises reserving the computing capacity on one or more external servers that are located in a different location than the server system.

10. A method comprising:
detecting, by a computer system, past computing usage of server resources of the computer system during an execution of one or more computing tasks over a previous period of time;
determining, by the computer system using a machine learning (ML) engine comprising one or more ML models, a predicted future computing usage of the server resources at a first time during a future period of time based on the past computing usage, wherein the one or more ML models are trained based on demand metrics for a plurality of machine pools capable of processing the one or more computing tasks using the server resources of the computer system;
determining, by the computer system, available server resources from the server resources during the future period of time, wherein the available server resources include at least a portion of the plurality of machine pools each having one or more machines operable to perform the one or more computing tasks;
determining, by the computer system using the ML engine, a baseline level of the available server resources to allocate for the predicted future computing usage based on the past computing usage and one or more rule, wherein the baseline level comprises a threshold amount of resources that is allocated to prevent the available server resources from falling below a minimum capacity of the available server resources;
determining, by the computer system, an allocation of at least one machine from the plurality of machine pools that is designated for handling of a computing task associated with the predicted future computing usage;
configuring, by the computer system, a computing capacity of the available server resources allocated to one or more computing devices at a current time based on the determined allocation of the at least one machine and the baseline level;
executing, by the computer system, the computing task using the at least one machine from at least one of the plurality of machine pools, wherein the executing the computing task comprises:
dynamically sizing the plurality of machine pools to allocate the at least one machine to the computing task, and
allocating a reserve machine pool from the plurality of machine pools for additional computing tasks;
analyzing, by the computer system, a current computing usage of the server resources based on executing the computing tasks and a plurality of additional computing tasks executed using the available server resource at the current time; and
retraining, by the computer system, the ML engine based on the current computing usage, wherein the one or more ML models of the ML engine comprise at least one continuous learning model, and wherein the retraining comprises:
utilizing live data from the current computing usage to adjust the at least one continuous learning model based on changes in the past computing usage and the current computing usage over a selected period of time including the previous period of time and the current time,
adjusting at least one of a weight or a node of the one or more ML models based on a recent change bias associated with the past computing usage and the current computing usage, and
updating the baseline level based on the retraining for future resource allocation at one or more future periods of time.

11. The method of claim 10, wherein the configuring the computing capacity comprises:
providing an increased amount of the available server resources to be accessible by the one or more computing devices at the future period of time from one of a standard amount of the available server resources set by the computer system or a previous amount of the available server resources provided by the computer system to the one or more computing devices.

12. The method of claim 10, wherein the configuring the computing capacity comprises:
providing a decreased amount of available server resources to be accessible by the one or more computing devices at the future period of time from one of a standard amount of the available server resources set by the computer system or a previous amount of the available server resources provided by the computer system to the one or more computing devices.

13. The method of claim 12, wherein the providing the decreased amount prevents the available server resources from falling below the minimum capacity of the available server resources established by the baseline level.

14. The method of claim 10, wherein the at least one continuous learning model is further trained for pattern identification over the previous period of time based on at least one of daily network traffic or weekly network traffic.

15. The method of claim 10, wherein the determining the predicted future computing usage of the server resources further uses one or more of a linear curve, a first degree curve, or a second degree curve fitted from past computing usage using the one or more ML models.

16. The method of claim 10, wherein the computing capacity is utilized by the one or more computing devices to process electronic transactions using one or more digital wallets or one or more digital accounts provided by the computing system.

17. The method of claim 10, wherein the computing capacity comprises one or more fraud detection engines and one or more payment platforms provided by the computing system during electronic transaction processing.

18. The method of claim 10, wherein configuring the computing capacity comprises:

utilizing one or more external cloud computing resources to provide the computing capacity to the one or more computing devices.

19. A non-transitory machine-readable medium having stored thereon machine-readable instructions executable to cause a machine to perform operations comprising:

analyzing, using a machine learning (ML) engine comprising one or more ML models, past computing usage of server resources of a server system during a performance of one or more computing tasks over a previous period of time, wherein the one or more ML models are trained based on demand metrics for a plurality of machine pools capable of processing the one or more computing tasks using the server resources of the server system;

determining, based on the analyzing, a predicted future computing usage of the server resources at a first time during a future period of time;

determining available server resources from the server resources during the future period of time, wherein the available server resources include at least a portion of the plurality of machine pools each having one or more machines operable to perform the one or more computing tasks;

determining, using the ML engine, a baseline level of the available server resources to allocate for the predicted future computing usage based on the past computing usage and one or more rule, wherein the baseline level comprises a threshold amount of resources that is allocated to prevent the available server resources from falling below a minimum capacity of the available server resources;

determining an allocation of at least one machine from the plurality of machine pools that is designated for handling of a computing task associated with the predicted future computing usage;

configuring a computing capacity of the available server resources allocated to one or more computing devices at a current time based on the determined allocation of the at least one machine and the baseline level;

executing the computing task using the at least one machine from at least one of the plurality of machine pools, wherein the executing the computing task comprises:

dynamically sizing the plurality of machine pools to allocate the at least one machine to the computing task, and allocating a reserve machine pool from the plurality of machine pools for additional computing tasks;

analyzing a current computing usage of the server resources based on executing the computing tasks and a plurality of additional computing tasks executed using the available server resource at the current time; and retraining the ML engine based on the current computing usage, wherein the one or more ML models of the ML engine comprise at least one continuous learning model, and wherein the retraining comprises:

utilizing live data from the current computing usage to adjust the at least one continuous learning model based on changes in the past computing usage and the current computing usage over a selected period of time including the previous period of time and the current time, adjusting at least one of a weight or a node of the one or more ML models based on a recent change bias associated with the past computing usage and the current computing usage, and updating the baseline level based on the retraining for future resource allocation at one or more future periods of time.

20. The non-transitory machine-readable medium of claim 19, wherein the configuring the computing capacity comprises one of:

increasing an amount of the available server resources available to the one or more computing devices at the future period of time from a previously used amount of the server resources utilized during the previous period of time; or decreasing an amount of available server resources available to the one or more computing devices at the future period of time from a previously used amount of the server resources utilized during the previous period of time.

* * * * *